United States Patent
Ratner

(10) Patent No.: US 11,747,448 B2
(45) Date of Patent: Sep. 5, 2023

(54) SENSOR ASSEMBLY FOR VEHICLES

(71) Applicant: UATC, LLC, San Francisco, CA (US)

(72) Inventor: Daniel Ratner, San Francisco, CA (US)

(73) Assignee: UATC, LLC, Mountain View, CA (US)

(*) Notice: Subject to any disclaimer, the term of this patent is extended or adjusted under 35 U.S.C. 154(b) by 332 days.

(21) Appl. No.: 17/145,943

(22) Filed: Jan. 11, 2021

(65) Prior Publication Data

US 2021/0132193 A1 May 6, 2021

Related U.S. Application Data

(63) Continuation of application No. 15/885,308, filed on Jan. 31, 2018, now Pat. No. 10,914,820.

(51) Int. Cl.
*G01S 7/481* (2006.01)
*G01S 17/08* (2006.01)
*G01S 17/42* (2006.01)
*G05D 1/02* (2020.01)

(52) U.S. Cl.
CPC ............ *G01S 7/4813* (2013.01); *G01S 17/08* (2013.01); *G01S 17/42* (2013.01); *G05D 1/0231* (2013.01)

(58) Field of Classification Search
CPC ........ G01S 7/4813; G01S 17/42; G01S 17/08; G05D 1/0231
USPC ....................................................... 356/4.01
See application file for complete search history.

(56) References Cited

U.S. PATENT DOCUMENTS

| 5,012,745 | A | 5/1991 | Yamashita |
| 5,170,458 | A | 12/1992 | Aoyagi |
| 5,590,604 | A | 1/1997 | Lund |
| 5,598,783 | A | 2/1997 | Lund |
| 5,726,647 | A | 3/1998 | Waffler |
| 6,122,040 | A | 9/2000 | Arita |
| 6,434,302 | B1 | 8/2002 | Fidric |
| 6,657,705 | B2 | 12/2003 | Sano |
| 6,827,265 | B2 | 12/2004 | Knowles |
| 6,860,350 | B2 | 3/2005 | Beuhler |
| 6,956,227 | B2 | 10/2005 | Miyazaki |
| 7,248,342 | B1 | 7/2007 | Deanan |
| 7,406,220 | B1 | 7/2008 | Christensen |
| 7,532,311 | B2 | 5/2009 | Henderson |

(Continued)

FOREIGN PATENT DOCUMENTS

| CA | 2980305 | 9/2016 |
| CA | 3027331 | 2/2017 |

(Continued)

OTHER PUBLICATIONS

Circumvent definition from Merrian-Webster, downloaded Apr. 24, 2020 from https://www.merriam-webster.com/thesaurus/circumvent. 8 pages (Year: 2020).

(Continued)

*Primary Examiner* — Daniel L Murphy
(74) *Attorney, Agent, or Firm* — Dority & Manning, P.A.

(57) ABSTRACT

A sensor assembly includes a first body that rotates a sensor component about an axis, and a second body coupled to the first body to form a separation gap. The separation gap extends radially inward from a gap inlet to a sealed barrier of the second body. The separation gap may be configured with a set of air guide structural features, to induce formation of eddies from air intake received through the gap inlet, as air from the air intake moves inward towards the sealed barrier.

20 Claims, 3 Drawing Sheets

(56) References Cited

U.S. PATENT DOCUMENTS

| | | |
|---|---|---|
| 7,650,239 B2 | 1/2010 | Samukawa |
| 7,961,301 B2 | 6/2011 | Earhart |
| 8,208,716 B2 | 6/2012 | Choi |
| 8,344,940 B2 | 1/2013 | Jeong |
| 8,610,881 B2 | 12/2013 | Gammenthaler |
| 8,692,980 B2 | 4/2014 | Gilliland |
| 8,736,818 B2 | 5/2014 | Weimer |
| 8,767,186 B2 | 7/2014 | Lu |
| 8,797,828 B1 | 8/2014 | Lev |
| 8,899,903 B1 | 12/2014 | Saad |
| 8,909,375 B2 | 12/2014 | Larson |
| 8,994,581 B1 | 3/2015 | Brown |
| 9,126,595 B2 | 9/2015 | Seo |
| 9,201,424 B1 | 12/2015 | Ogale |
| 9,224,053 B1 | 12/2015 | Ferguson |
| 9,228,833 B2 | 1/2016 | Zeng |
| 9,231,998 B2 | 1/2016 | Lu |
| 9,247,211 B2 | 1/2016 | Zhang |
| 9,328,526 B2 | 5/2016 | Shani |
| 9,360,554 B2 | 6/2016 | Retterath |
| 9,383,753 B1 | 7/2016 | Templeton |
| 9,453,914 B2 | 9/2016 | Stettner |
| 9,454,150 B2 | 9/2016 | Uehara |
| 9,529,079 B1 | 12/2016 | Droz |
| 9,625,582 B2 | 4/2017 | Gruver |
| 9,637,118 B2 | 5/2017 | Yokota |
| 9,669,827 B1 | 6/2017 | Ferguson |
| 9,696,722 B1 | 7/2017 | Ulrich |
| 9,719,801 B1 | 8/2017 | Ferguson |
| 9,720,415 B2 | 8/2017 | Levinson |
| 9,804,264 B2 | 10/2017 | Villeneuve |
| 9,823,353 B2 | 11/2017 | Eichenholz |
| 9,840,256 B1 | 12/2017 | Valois |
| 9,841,495 B2 | 12/2017 | Campbell |
| 9,841,763 B1 | 12/2017 | Valois |
| 9,857,468 B1 | 1/2018 | Eichenholz |
| 9,869,753 B2 | 1/2018 | Eldada |
| 9,869,754 B1 | 1/2018 | Campbell |
| 9,874,635 B1 | 1/2018 | Eichenholz |
| 9,880,263 B2 | 1/2018 | Droz |
| 9,897,687 B1 | 2/2018 | Campbell |
| 10,338,225 B2 | 7/2019 | Boehmke |
| 2002/0135468 A1 | 9/2002 | Bos |
| 2004/0030474 A1 | 2/2004 | Samuel |
| 2004/0148093 A1 | 7/2004 | Tanaka |
| 2004/0174537 A1 | 9/2004 | Ferger |
| 2005/0095092 A1 | 5/2005 | Segal |
| 2005/0185846 A1 | 8/2005 | Luo |
| 2005/0196015 A1 | 9/2005 | Luo |
| 2005/0196035 A1 | 9/2005 | Luo |
| 2006/0089765 A1 | 4/2006 | Pack |
| 2006/0149134 A1 | 7/2006 | Soper |
| 2006/0158423 A1 | 7/2006 | Kern |
| 2006/0227317 A1 | 10/2006 | Henderson |
| 2007/0200064 A1 | 8/2007 | Remillard |
| 2007/0212006 A1 | 9/2007 | Wysocki |
| 2007/0219720 A1 | 9/2007 | Trepangier |
| 2008/0002427 A1 | 1/2008 | Kropac |
| 2008/0039991 A1 | 2/2008 | May |
| 2008/0136626 A1 | 6/2008 | Hudson |
| 2008/0161986 A1 | 7/2008 | Breed |
| 2008/0215184 A1 | 9/2008 | Choi |
| 2009/0115994 A1 | 5/2009 | Stettner |
| 2009/0312906 A1 | 12/2009 | Bauer |
| 2009/0319112 A1 | 12/2009 | Freaene |
| 2010/0013615 A1 | 1/2010 | Hebert |
| 2010/0020306 A1 | 1/2010 | Hall |
| 2010/0053715 A1 | 3/2010 | O'Neill |
| 2010/0110192 A1 | 5/2010 | Johnston |
| 2010/0182587 A1 | 7/2010 | Fluckiger |
| 2010/0185353 A1 | 7/2010 | Barwick |
| 2010/0194890 A1 | 8/2010 | Weller |
| 2010/0208034 A1 | 8/2010 | Chen |
| 2010/0208244 A1 | 8/2010 | Earhart |
| 2011/0050855 A1 | 3/2011 | Nobis |
| 2011/0134249 A1 | 6/2011 | Wood |
| 2011/0166757 A1 | 7/2011 | Otanez |
| 2011/0184605 A1 | 7/2011 | Neff |
| 2011/0241845 A1 | 10/2011 | Sullivan |
| 2011/0245964 A1 | 10/2011 | Sullivan |
| 2011/0301786 A1 | 12/2011 | Allis |
| 2011/0317993 A1 | 12/2011 | Weissler |
| 2012/0008129 A1 | 1/2012 | Lu |
| 2012/0033196 A1 | 2/2012 | Vanek |
| 2012/0038903 A1 | 2/2012 | Weimer |
| 2012/0044476 A1 | 2/2012 | Earhart |
| 2012/0154785 A1 | 6/2012 | Gilliland |
| 2012/0239238 A1 | 9/2012 | Harvey |
| 2013/0078063 A1 | 3/2013 | Shanil |
| 2013/0166105 A1 | 6/2013 | Wastel |
| 2013/0190963 A1 | 7/2013 | Kuss |
| 2013/0226431 A1 | 8/2013 | Lu |
| 2013/0317649 A1 | 11/2013 | Larson |
| 2014/0041966 A1 | 2/2014 | Healy |
| 2014/0136414 A1 | 5/2014 | Abhyanker |
| 2014/0168631 A1 | 6/2014 | Haslim |
| 2014/0176933 A1 | 6/2014 | Haslim |
| 2014/0231647 A1 | 8/2014 | Chinn |
| 2014/0277691 A1 | 9/2014 | Jacobus |
| 2014/0286744 A1 | 9/2014 | Shani |
| 2015/0025731 A1 | 1/2015 | Uehara |
| 2015/0091374 A1 | 4/2015 | Lenius |
| 2015/0202939 A1 | 7/2015 | Stettner |
| 2015/0293225 A1 | 10/2015 | Riley |
| 2015/0293228 A1 | 10/2015 | Retterath |
| 2015/0334269 A1 | 11/2015 | Yokota |
| 2016/0003946 A1 | 1/2016 | Gilliland |
| 2016/0129917 A1 | 5/2016 | Gariepy |
| 2016/0223671 A1 | 8/2016 | Thayer |
| 2016/0231746 A1 | 8/2016 | Hazelton |
| 2016/0282468 A1 | 9/2016 | Gruver |
| 2016/0291134 A1 | 10/2016 | Droz |
| 2016/0318415 A1 | 11/2016 | Salasoo |
| 2016/0349746 A1 | 12/2016 | Grau |
| 2017/0096138 A1 | 4/2017 | Reiff |
| 2017/0155225 A1 | 6/2017 | Villeneuve |
| 2017/0168146 A1 | 6/2017 | Boehmke |
| 2017/0184399 A1 | 6/2017 | Thayer |
| 2017/0226765 A1 | 8/2017 | Wastel |
| 2017/0255199 A1 | 9/2017 | Boehmke |
| 2017/0357260 A1 | 12/2017 | Gilliland |
| 2018/0070804 A1 | 3/2018 | Tesar |
| 2018/0149732 A1 | 5/2018 | Droz |
| 2018/0329067 A1 | 11/2018 | Boehmke |
| 2019/0146505 A1 | 5/2019 | Boehmke |

FOREIGN PATENT DOCUMENTS

| | | |
|---|---|---|
| CN | 102494609 | 6/2012 |
| CN | 202267452 | 6/2012 |
| CN | 101959022 | 11/2012 |
| CN | 103152518 | 6/2013 |
| CN | 103179339 | 6/2013 |
| CN | 203353019 | 12/2013 |
| CN | 104133473 | 11/2014 |
| CN | 203930064 | 11/2014 |
| CN | 103001428 | 5/2015 |
| CN | 102857592 | 12/2015 |
| CN | 204836334 | 12/2015 |
| CN | 204990755 | 1/2016 |
| CN | 103146355 | 2/2016 |
| CN | 205747641 | 11/2016 |
| CN | 106313078 | 1/2017 |
| CN | 207908673 | 9/2018 |
| DE | 10244638 | 4/2004 |
| EP | 0185816 | 7/1986 |
| EP | 2940489 | 11/2015 |
| EP | 1816514 | 8/2017 |
| JP | H09163197 | 12/1998 |
| JP | H09326032 | 6/1999 |
| JP | 2005024463 | 1/2005 |
| JP | 2007249632 | 9/2007 |
| JP | 2011123078 | 12/2010 |
| RU | 2493988 | 9/2013 |

(56) References Cited

FOREIGN PATENT DOCUMENTS

| RU | 2012154453 | 6/2014 |
|----|------------|--------|
| WO | WO2011/104706 | 9/2011 |
| WO | WO2017177206 | 9/2018 |

OTHER PUBLICATIONS

International Preliminary Report on Patentability for Application No. PCT/US2019/015882, dated Aug. 13, 2020, 5 pages.
Internation Search Report and Written Opinion for Application No. PCT/US2019/015882, dated May 16, 2019, 12 pages.

SENSOR ASSEMBLY FOR VEHICLES

CROSS REFERENCE TO RELATED APPLICATIONS

This application is a continuation of U.S. patent application Ser. No. 15/885,308, titled "SENSOR ASSEMBLY FOR VEHICLES" filed on Jan. 31, 2018, which is incorporated herein by reference.

TECHNICAL FIELD

Examples described herein relate to sensor assemblies for use with vehicles.

BACKGROUND

External sensor assemblies can be used with autonomous vehicles in order to sense surrounding and nearby regions. Some types of sensor assemblies rotate signal emitters to sense regions across a wide sensing angle. For example, light detection and ranging sensors (often referred to as "LiDAR") typically use a rotating head to span signal emission across regions in front of and around a vehicle.

DETAILED DESCRIPTION

According to examples, a sensor assembly includes a first body that rotates a sensor component about an axis, and a second body coupled to the first body to form a separation gap. The separation gap extends radially inward from a gap inlet to a sealed barrier of the second body. The separation gap may be configured with a set of air guide structural features, to induce formation of eddies from air intake received through the gap inlet, as air from the air intake moves inward towards the sealed barrier.

With respect to some examples as described, the eddies that are induced by air guide structures can include, for example, swirling of the airflow within channels formed by the bodies of the sensor assembly. The airflow can thus circulate, with the momentum of the airflow being directionally varied so as to counter the initial momentum of the airflow when it is received in the channels of the separation gap.

In some examples, the sensor assembly includes a set of air guide structural features that form one or more channels. The one or more channels include at least an entry channel that is aligned to intersect an incoming airflow from the gap inlet.

As an addition or variation, the sensory assembly may include multiple channels, with the channels being radially offset from one another. The channels may combine to induce eddies from airflow that is received through the gap inlet. When the sensor assembly is in operation, the eddies may serve to reduce the momentum and energy of the airflow as air travels radially inward towards an interior sealed barrier.

Systems, apparatus, and methods are described below in the context of external sensor units for autonomous vehicles. However, it will be appreciated that the embodiments are not limited to such context. For instance, example embodiments include partially or fully internal sensors for vehicles.

Figure 1:
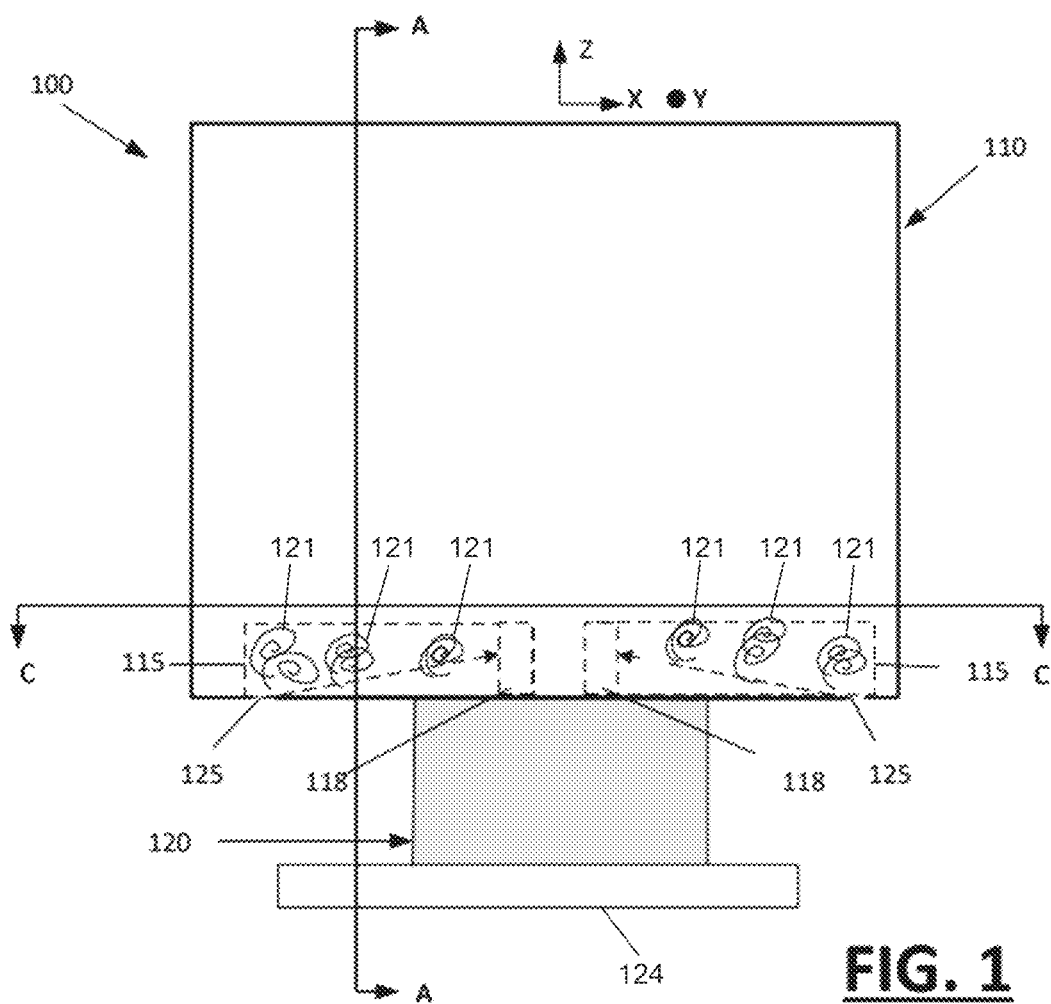
FIG. 1 is a side view of an example sensor assembly for external use with an autonomous vehicle.

FIG. 1 is a side view of an example sensor assembly for external use with a vehicle. In particular, a sensor assembly 100 includes a first body, shown as a head structure 110 and a second body, shown as a base structure 120. In operation, the head structure 110 revolves on the base structure 120 about an axis of rotation (shown as axis Z). The base structure 120 includes a bottom segment 124 that mounts to an external surface (e.g., roof) of the vehicle. In examples, the sensor assembly 100 can be implemented as part of an autonomous control system for operating the vehicle.

The head structure 110 can house a sensor component, such as a signal emitter (e.g., light emitter, as part of a LiDAR assembly). To extend the field of view of the sensor component, the head structure 110 can rotate about the rotational axis Z, while supported on a top portion 222 (see FIG. 2A) of the base structure 120. In some examples, the head structure 110 can rotate at several revolutions per minute or more (e.g., 100 to 1000 RPM). Still further, in other variations, the sensor assembly 100 may include multiple rotating bodies which rotate independent of one another.

A separation gap 115 may define the interface between the head structure 110 and the base structure 120. The separation gap 115 may extend from an exterior of the sensor assembly 100, radially inward towards a sealed barrier 118. The sealed barrier 118 can serve to block moisture and debris from affecting internal components which may reside within the base structure 120.

Examples recognize that in a deployed environment, the separation gap 115 between the head structure 110 and the base structure 120 is a source of moisture and/or debris accumulation as a result of air intake from the environment. For example, in one implementation, the sensor assembly 100 may operate on top of, or outside of a vehicle that moves at a relatively high speed (e.g., 40-60 MPH), and sometimes in conditions where there is wind or rain. Moreover, examples recognize that the operational parameters under which the sensor assembly 100 can operate may promote air inflow and moisture accumulation. For example, the head structure 110 may operate at high revolution rates (e.g., 100 to 1000 RPM) which can cause, for example, moisture and water to separate from the airflow, and force movement of water and debris inward towards the sealed barrier 118. Examples recognize that the accumulation of moisture and debris over time, resulting from operating and environmental conditions of the sensor assembly 100, can burden the sealed barrier 118 and promote deterioration of the sealed barrier 118 over time.

As shown by FIG. 1, the sensor assembly 100 can configure the head structure 110 and/or the base structure 120 to include structural features that line a surface of the separation gap 115, where the structural features are shaped and positioned to induce eddies from air intake at a gap inlet 125. By forming eddies 121 from air intake, the separation gap 115 is able to reduce the momentum of the air intake, causing air, moisture and/or debris that travel radially inward within the separation gap 115 to lose momentum and energy. As a result, less air from the air intake reaches the interior of the separation gap 115, resulting in less moisture and/or debris accumulating on the sealed barrier 118.

Figure 2A:
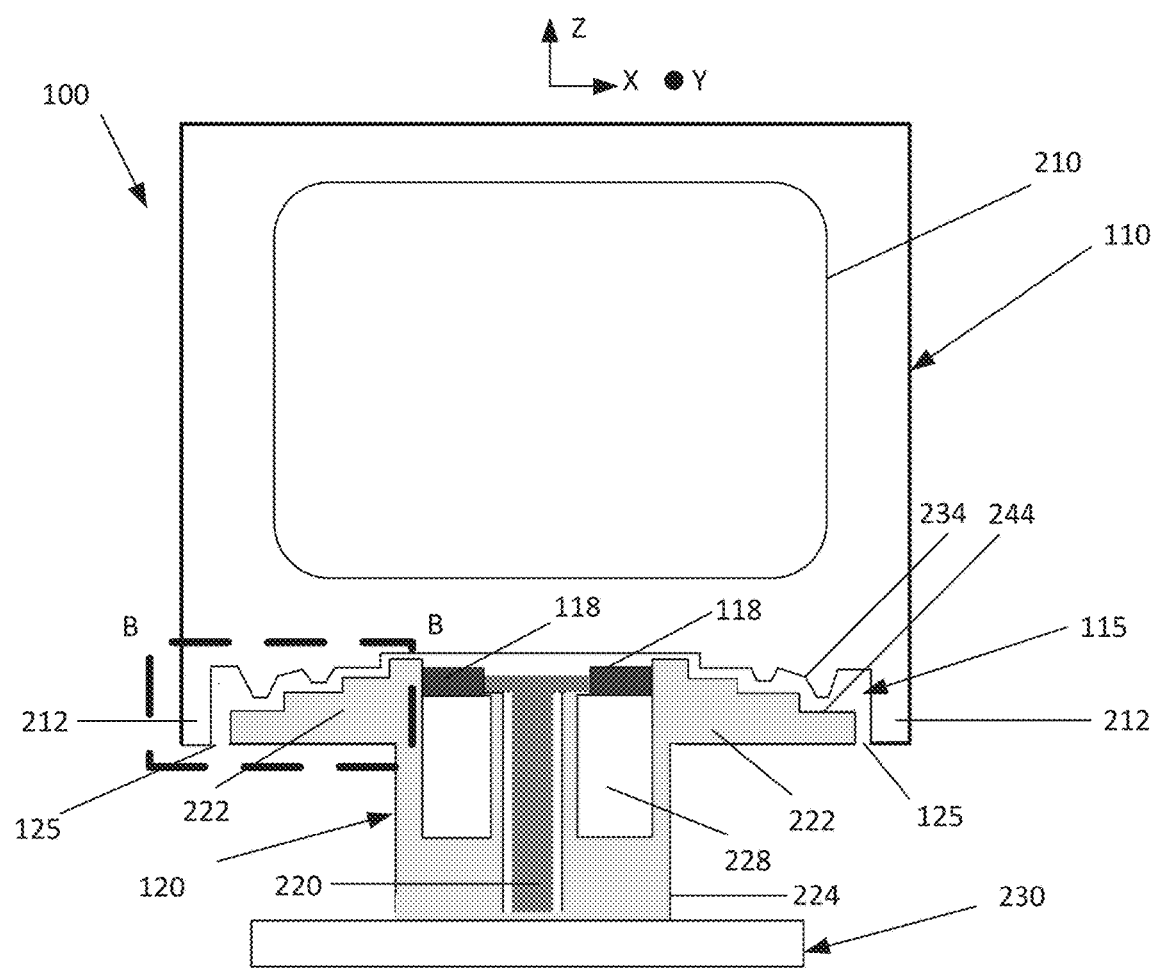
FIG. 2A is a cross-sectional view of a sensor along lines A-A of FIG. 1, according to one or more examples.

FIG. 2A is a cross-sectional view of FIG. 1 along lines A-A, according to one or more examples. In an example of FIG. 2A, the head structure 110 includes a sensor component, such as a signal emitter 210. The head structure 110 may retain and position the signal emitter 210 at numerous positions along an arc defined by the Z axis. In some examples, the signal emitter 210 can spin or revolve several times a minute, or faster (e.g., 100-1000 times per minute). By way of example, the sensor assembly 100 may correspond to a LiDAR sensor, and the signal emitter 210 may correspond to a light emitter. The signal emitter 210 may be seated within the head structure 110, such that the signal emitter 210 can be pivoted (e.g., with respect to X and Y axis) at the same time the head structure 110 swivels, spins or otherwise rotates with respect to the Z-axis.

The operation of the signal emitter 210 may be in conjunction with operation of, for example, an autonomous vehicle. In such context, the head structure 110 may rotate about the Z-axis while airflow is directed onto the surface of the sensor assembly 100 along a direction of travel of the vehicle (as shown by the X axis). In operation, the signal emitter 210 may emit signals (e.g., pulses of light) and use sensors to detect reflection or return of the signals. The detected signal return of the emitted signals can be captured and used to generate, for example, (i) range information indicating a depth of a surface which reflected the signal, and/or (ii) an image of a region near the vehicle (e.g., several car lengths in front of the vehicle).

In one implementation, the head structure 110 may be connected to a shaft 220, which extends to a base section 230. The shaft 220 may be connected to the head structure 110, to rotate the head structure 110 while the base structure 120 remains fixed. The shaft 220, or portion thereof, may rotate the head structure 110 using a motor (not shown).

The base structure 120 provides a base on which the head structure 110 rotates. In an example, the head structure 110 includes a perimeter section 212 which surrounds a top portion 222 of the base structure 120. The top portion 222 may have a greater dimension than, for example, a midsection 224 and base section 230 of the base structure 120. The perimeter section 212 of the head structure 110 can form the gap inlet 125 with the top portion 222 of the base structure 120. In this way, the gap inlet 125 can be oriented downward towards the base section 230.

When the head structure 110 is rotating, the perimeter section 212 rotates about the top portion 222, with the gap inlet 125 being a circuitous (e.g., elliptical or circular) formation at an interface of the head structure 110 and the base structure 120. The perimeter section 212 of the head structure 110 may be dimensioned relative to the top portion 222 of the base structure 120, such that the gap inlet 125 is oriented to face the base section 230. The separation gap 115 may extend radially inward from the gap inlet 125 to the sealed barrier 118. The sealed barrier 118 may block moisture and debris that enters through the separation gap 115 from reaching and harming sensitive internal components of the sensor assembly 100. By way of example, the base structure 120 may include one or more interior sections 228 which retain the sensitive electrical components.

According to some examples, the separation gap 115 may be provided with air guide structural features that define the spacing between the head structure 110 and the base structure 120. The air guide structural features serve to reduce the momentum and energy of the airflow that is received through the gap inlet 125. In some examples, the air guide structural features of the separation gap 115 induce eddies from the airflow that is received through the gap inlet 125. As an addition or variation, the separation gap 115 may include obstructions and/or barriers which further reduce the momentum and energy of the incoming airflow. As described with various examples, the reduction of momentum and energy in the airflow also reduces the amount of moisture and debris that accumulates on or near the sealed barrier 118. As a result, the sealed barrier 118 is better protected over time, given environmental and operating conditions which the sensor assembly 100 is subject to with operation of the respective autonomous vehicle.

In some examples, the head structure 110 provides a ceiling 234 for the separation gap 115, and the base structure 120 provides a floor 244 for the separation gap 115. The air guide structural features of the separation gap 115 can be unitarily formed or otherwise integrated with the respective surfaces of the head structure 110 and the base structure 120 which form the ceiling 234 and the floor 244, respectively. By way of example, the air guide structural features provided with the separation gap 115 can include walls, steps, corners, crevices, and/or recesses that are unitarily formed, or otherwise integrated with the ceiling 234 and/or the floor 244 of the separation gap 115.

Figure 2B:
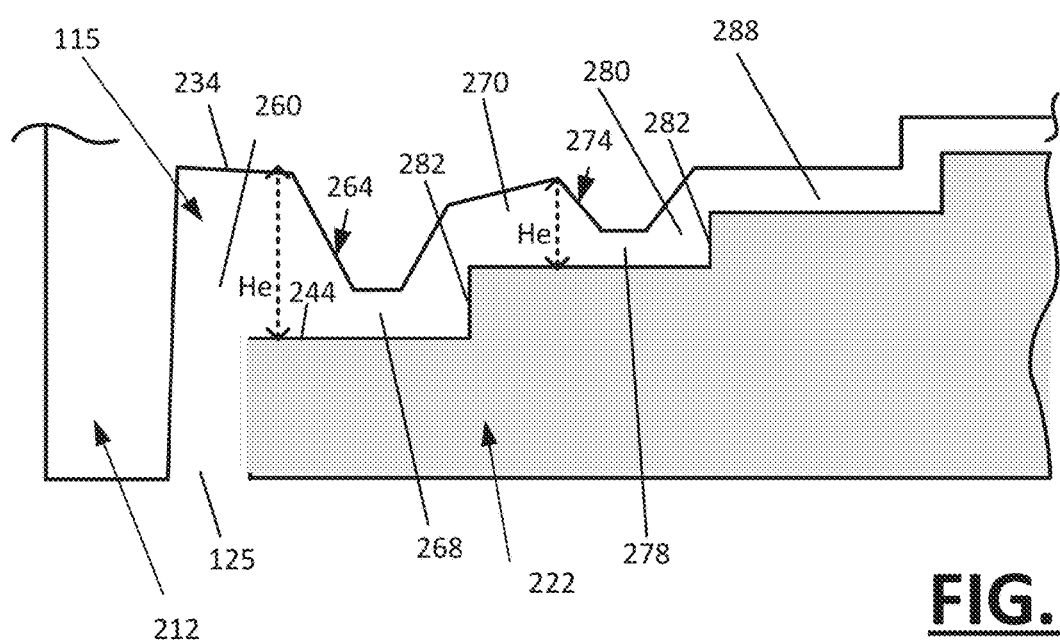
FIG. 2B is a close-up of section B-B of a sensor assembly of FIG. 2A, according to one or more examples.

FIG. 2B illustrates a close-up of section B-B of FIG. 2A. As shown by an example of FIG. 2B, the gap inlet 125 may be formed by the perimeter section 212 of the head structure 110 and the top portion 222 of the base structure 120. In an example shown, the separation gap 115 may include an entry channel 260 that is defined in part by the ceiling 234 and a ceiling wall 264 extending downward from the ceiling 234 towards the floor 244. The entry channel 260 can include an outlet passage 268 that extends into an intermediate channel 270, formed in part by an intermediate wall 274 that forms an intermediate outlet passage 278 and another channel 280.

In some examples, the floor 244 of the separation gap 115 includes one or multiple step structures 282 which elevate the separation gap 115 while disrupting airflow that is directed inward towards the sealed barrier 118. Each step structure 282 can be unitarily formed from a surface of the base structure 120, which forms the floor 244 of the separation gap 115.

In examples, the entry channel 260 is shaped to induce eddies from airflow that is received through the gap inlet 125. The entry channel 260 can be shaped to induce eddies from a significant portion of the incoming airflow. The entry channel 260 may receive the incoming airflow via the gap inlet 125, such that air from the incoming airflow circulates within the entry channel 260 before the air encounters the outlet passage 268. In this way, the eddies that are induced from the incoming airflow are retained for a duration of time before their air is circulated through the outlet passage 268.

The ceiling wall 264 can dimension the outlet passage 268 to be a fraction (e.g., 10-30%) of a height of the entry channel 260. Additionally, the entry channel 260 can be oriented so that it is aligned with a direction of initial airflow received through the gap inlet 125. In this way, the incoming airflow is disrupted, and circulated within the entry channel 260 before portions are passed through the outlet passage 268.

In similar fashion, the intermediate channel 270 can utilize the intermediate wall 274 and the step structure 282 to further diminish the momentum and energy of the incoming airflow. Thus, as portions of the incoming airflow progresses inward, additional eddies may form in the intermediate channel 270, further diminishing the momentum and energy of the airflow.

As shown by examples of FIG. 2A and FIG. 2B, the entry channel 260 and the intermediate channel 270 may be positioned to induce and capture eddies from incoming airflow. Other structures, such as step structures 282, may also be used to elevate and/or disrupt airflow. As the sensor assembly 100 is subjected to heavy use in various environmental conditions, the configuration and arrangement of airflow structural features, such as provided by entry channel 260, intermediate channel 270 and step structures 282, serve to reduce the momentum and energy of the airflow that reaches the sealed barrier 118. As a result, less moisture and debris is accumulated at the sealed barrier 118, so as to promote longevity of the sealed barrier 118 and protect components retained within the interior sections 228.

Figure 2C:
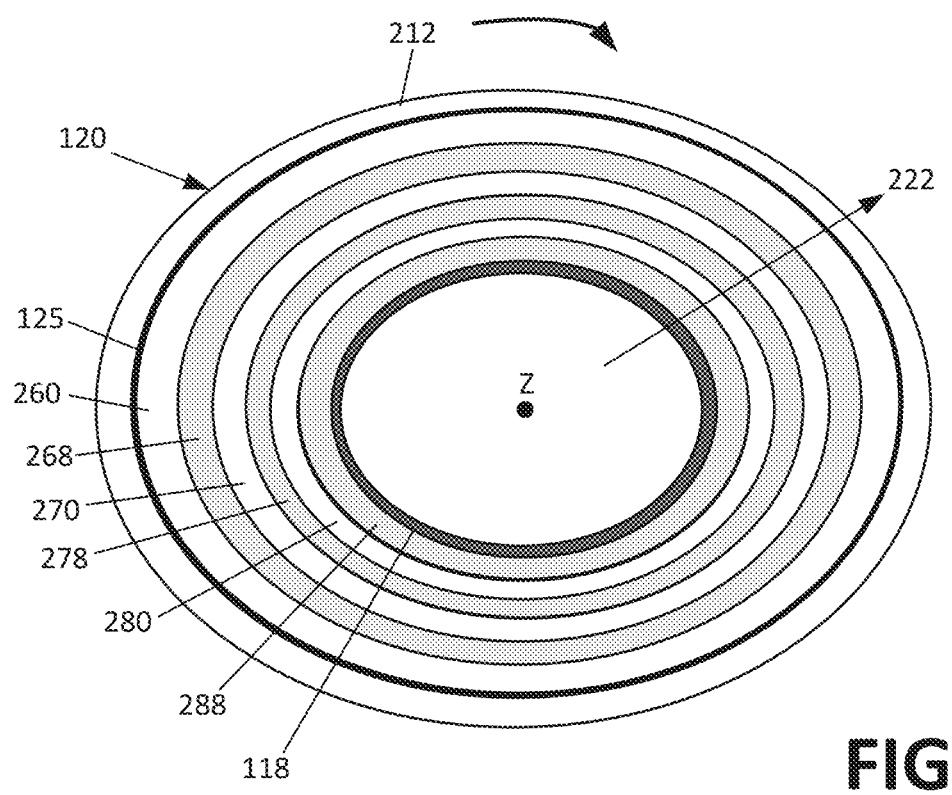
FIG. 2C is a cross-sectional view of a sensor assembly along lines C-C of FIG. 1, according to one or more examples.

FIG. 2C is a cross-sectional view of the sensor assembly 100 along lines C-C of FIG. 1. As described with examples of FIG. 2A and FIG. 2B, the separation gap 115 can be formed by air guide structural features which combine to form multiple channels 260, 270, 280 that are displaced radially with respect to one another. The multiple channels 260, 270, 280 may be interconnected by respective outlet passages 268, 278, 288 with the outlet passage 288 extending to the sealed barrier 118. When the sensor assembly 100 is in operation, the airflow may be received through the gap inlet 125. With movement of the vehicle and rotational motion of the head structure 110, the airflow may move radially inward from the gap inlet 125 towards the sealed barrier 118, with the respective channels 260, 270, 280 inducing and retaining eddies from the received airflow received through the gap inlet 125. As eddies are formed in the entry channel 260, the incoming airflow loses energy and momentum, and portions of the incoming airflow pass through the outlet passage 268, where the air is received next in the intermediate channel 270. In an example, eddies are formed in the intermediate channel 270 before portions of the air pass through the outlet passage 278 and into the next channel 280, after which additional air may pass through the outlet passage 288 before reaching the sealed barrier 118.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A sensor assembly for an autonomous vehicle, the sensor assembly comprising:
a first body; and
a second body rotatable relative to the first body, the second body spaced apart by a gap that is defined between a first surface of the first body and a second surface of the second body,
wherein at least one of the first surface or the second surface includes a plurality of projections extending into the gap and spaced apart from one another, and wherein the gap is non-uniform.

2. The sensor assembly of claim 1, wherein:
the sensor assembly is defined along an axial direction and a radial direction;
the gap separates the second body from the first body in the axial direction; and
the gap is non-uniform along the radial direction.

3. The sensor assembly of claim 2, wherein the plurality of projections define a plurality of channels spaced apart from one another along the radial direction, each of the plurality of channels defined between adjacent projections along the radial direction.

4. The sensor assembly of claim 3, wherein a first channel of the plurality of channels is in fluid communication with a second channel of the plurality of channels and a third channel of the plurality of channels, the second channel positioned radially outward relative to the first channel, the third channel positioned radially inward relative to the first channel.

5. The sensor assembly of claim 4, wherein the gap defined between the first surface and the second surface at the third channel is narrower than the gap defined between the first surface and the second surface at the first channel or the second channel.

6. The sensor assembly of claim 3, wherein the plurality of projections comprise:
a first plurality of projections extending from the first surface; and
a second plurality of projections extending from the second surface.

7. The sensor assembly of claim 6, wherein the first plurality of projections comprise a plurality of steps.

8. The sensor assembly of claim 7, wherein the plurality of steps comprise a first step, a second step, and a third step positioned between the first step and the second step along the radial direction, the second step positioned radially inward relative to the first step and the third step, the second step being taller than the first step and the third step.

9. The sensor assembly of claim 8, wherein the second step is positioned radially outward of a seal barrier associated with the first body.

10. The sensor assembly of claim 3, further comprising:
a sensor component coupled to the second body.

11. The sensor assembly of claim 10, wherein the sensor component comprises a LIDAR sensor.

12. An autonomous vehicle comprising:
a vehicle body defining an interior; and
a sensor assembly comprising:
a first body removably coupled to the vehicle body, the first body being positioned outside of the interior of the vehicle body; and
a second body rotatable relative to the first body, the second body spaced apart from the first body by a gap that is defined between a first surface of the first body and a second surface of the second body,
wherein at least one of the first surface or the second surface includes a plurality of projections extending into the gap and spaced apart from one another, and wherein the gap is non-uniform.

13. The autonomous vehicle of claim 12, wherein:
the sensor assembly is defined along an axial direction and a radial direction;
the gap separates the second body from the first body in the axial direction; and
the gap is non-uniform along the radial direction.

14. The autonomous vehicle of claim 13, wherein the plurality of projections define a plurality of channels spaced apart from one another along the radial direction, each of the plurality of channels defined between adjacent projections along the radial direction.

15. The autonomous vehicle of claim 14, wherein a first channel of the plurality of channels is in fluid communication with a second channel of the plurality of channels and a third channel of the plurality of channels, the second channel positioned radially outward relative to the first channel, the third channel positioned radially inward relative to the first channel.

16. The autonomous vehicle of claim 12, wherein the plurality of projections comprise:
- a first plurality of projections extending from the first surface; and
- a second plurality of projections extending from the second surface.

17. The autonomous vehicle of claim 12, wherein the second body is spaced apart from the first body by an opening that is defined between the first body and the second body, the opening being in fluid communication with the gap.

18. The autonomous vehicle of claim 12, wherein the second body rotates at a speed ranging from 100 revolutions per minute to 1000 revolutions per minute.

19. The autonomous vehicle of claim 12, wherein the first body is mounted to a roof of the vehicle body.

20. The autonomous vehicle of claim 12, wherein the second body is rotatably coupled to a shaft extending into a cavity defined by the first body.

\* \* \* \* \*